No. 630,877.  
Patented Aug. 15, 1899.  
J. C. FOREAKER.  
COMBINED FAN AND CHURN.  
(Application filed Mar. 1, 1899.)  
(No Model.)
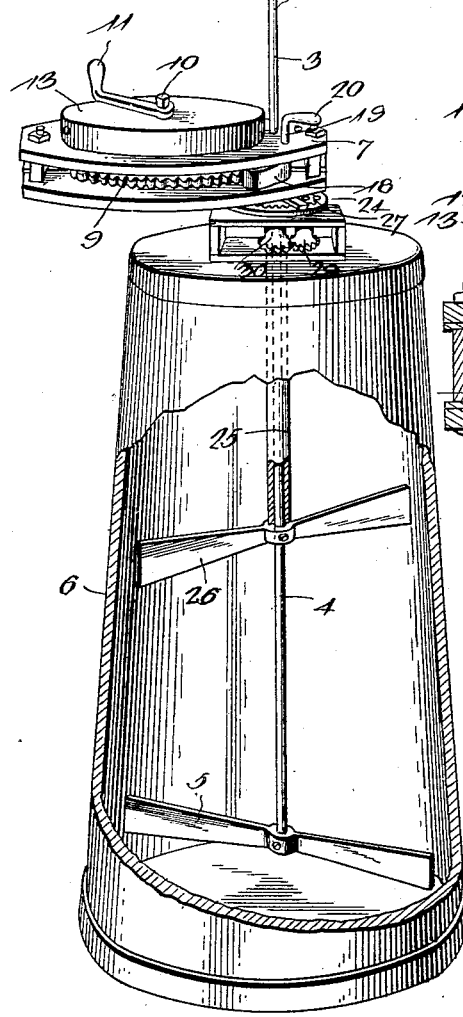
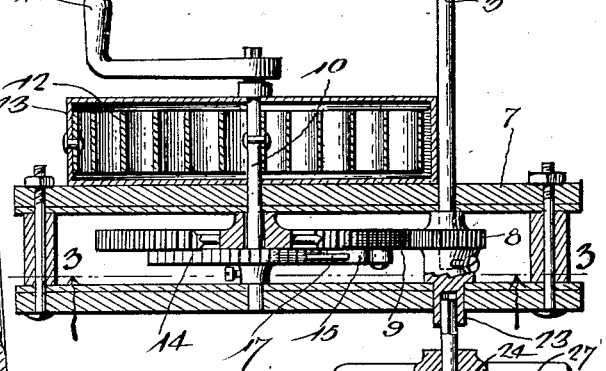
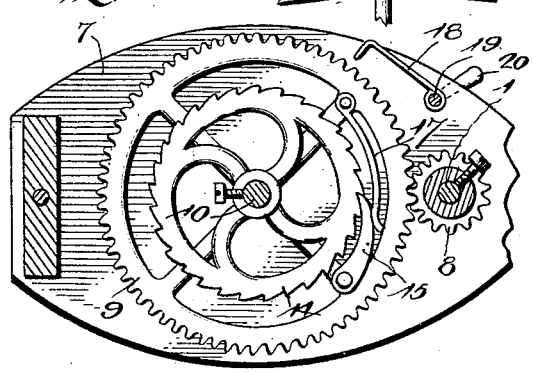
Witnesses  
J.C. Foreaker, Inventor.

UNITED STATES PATENT OFFICE.

JOHN C. FOREAKER, OF JOPLIN, MISSOURI, ASSIGNOR OF ONE-HALF TO J. T. MORROW, OF SAME PLACE.

COMBINED FAN AND CHURN.

SPECIFICATION forming part of Letters Patent No. 630,877, dated August 15, 1899.

Application filed March 1, 1899. Serial No. 707,255. (No model.)

*To all whom it may concern:*

Be it known that I, JOHN C. FOREAKER, a citizen of the United States, residing at Joplin, in the county of Jasper and State of Missouri, have invented a new and useful Combined Fan and Churn, of which the following is a specification.

The invention relates to improvements in a combined fan and churn.

The object of the present invention is to improve the construction of fans and churns, more especially the means for operating the same, and to provide a simple and comparatively inexpensive device adapted to operate a fan and a churn simultaneously and capable of permitting the fan to be detached and operated elsewhere.

A further object of the invention is to provide simple and effective means for enabling the butter to be readily collected after the operation of churning has been completed.

The invention consists in the construction and novel combination and arrangement of parts hereinafter fully described, illustrated in the accompanying drawings, and pointed out in the claim hereto appended.

In the drawings, Figure 1 is a perspective view of a combined fan and churn constructed in accordance with this invention. Fig. 2 is a vertical sectional view. Fig. 3 is a horizontal sectional view on line 3 3 of Fig. 2.

Like numerals of reference designate corresponding parts in all the figures of the drawings.

1 designates a vertical shaft carrying a fan 2 at its upper end and composed of upper and lower sections 3 and 4, the lower section being provided at its lower end with a dasher 5, arranged within a churn-body 6. The shaft 1 is journaled in suitable bearings of a frame or casing 7 and carries a pinion 8, which meshes with a gear-wheel 9 of a winding-shaft 10, and the latter, which is journaled in suitable bearings of the casing 7, is provided at its upper end with a crank-handle 11.

The power is obtained from a barrel-spring 12, arranged within a circular housing 13 and connected at its outer end with the same and at its inner end with the winding-shaft, and the latter is connected with the gear-wheel 9 by a clutch consisting of a ratchet-wheel 14 and a spring-actuated pawl 15, the ratchet-wheel being fixed to the winding-shaft and the pawl being mounted on the gear-wheel. The pawl is pivoted at one end near the periphery of the gear-wheel, and a spring 17, which is also mounted on the gear-wheel, has one end free and bearing against the pawl, near the engaging end thereof. After the barrel-spring has been wound up the device will operate until the spring runs down, and a spring of any desired strength and length may be employed. The device is held out of operation to prevent any waste of the power by a dog 18, arranged between the top and bottom of the casing and mounted on a shaft or spindle 19, which extends through the top of the casing and carries a handle 20, by means of which the dog is operated. The dog 18 is located adjacent to the periphery of the gear-wheel, as clearly illustrated in Fig. 3 of the accompanying drawings, and it is adapted to engage the teeth thereof, and when in such engagement will lock the gear-wheel against movement in either direction. Any suitable means may be employed for connecting the outer portion of the casing with the churn-body or other fixed support to prevent the motor from rotating around the shaft 3.

The fan, which may be of any desired construction, preferably consists of two blades 21, mounted on a cross piece or head 22, which is secured to the upper end of the shaft by any suitable means. The cross head or piece has its ends bifurcated to receive the blades, and it is preferably adjustably mounted on the shaft. The upper section of the shaft is provided at its lower end with a socket 23, detachably receiving the upper end of the lower section, and the latter carries an internal gear-wheel 24, which is connected by gearing with a tubular shaft or sleeve 25, arranged on the lower section 4 and carrying a dasher 26, which is operated the reverse of the dasher 5, one dasher being rotated in one direction and the other in the opposite direction, and these dashers are adjustably secured to their shafts. The dashers and the cross-head 22 are adjustably secured to the shafts by means of clamping-screws, as clearly illustrated in Fig. 1 of the accompanying drawings, and these clamping-screws permit the dashers and the fan to be arranged at the desired elevation. The internal gear-wheel meshes with an upper pinion 27 of a short counter-shaft 28, and the lower end of the latter is connected with the adjacent portion of the shaft 25 by pinions 29 and 30; but instead of employing the lower pinion 29 the lower pinion 30 may be arranged to mesh with the pinion 27, as will be readily understood. By this construction the dashers are reversely rotated, and after the operation of churning has been completed the set-screw for securing the pinion 29 to the shaft 28 may be loosened to throw the upper dasher out of operation, so that it will remain stationary while the lower dasher is being rotated to cause the butter to collect at the surface around the said upper dasher. The fan may be operated elsewhere, and it will operate in any position.

The invention has the following advantages: The combined churn and fan is simple and comparatively inexpensive in construction. It is effective both as a fan and churn, and while both the fan and churn are adapted to operate simultaneously the fan may be removed after the operation of churning has been completed, so that it can be used elsewhere.

Changes in the form, proportion, and minor details of construction within the scope of the appended claim may be resorted to without departing from the spirit or sacrificing any of the advantages of this invention.

What is claimed is—

A device of the class described comprising a horizontal casing, a housing mounted upon the casing, a winding-shaft, a barrel-spring arranged within the housing and connected with the winding-shaft, a gear-wheel arranged within the casing and connected by a clutch with the said shaft, a dog arranged within the casing at the periphery of the gear-wheel and adapted to engage the same, said dog being provided with an exteriorly-arranged handle, the vertical shaft 1 composed of two sections coupled at the bottom of the casing, a dasher carried by the lower section of the shaft, and a fan mounted on the upper section of the shaft, substantially as described.

In testimony that I claim the foregoing as my own I have hereto affixed my signature in the presence of two witnesses.

JOHN C. FOREAKER.

Witnesses:
F. L. YALE,
T. F. ENGLISH.